(12) United States Patent
Aeschlimann et al.

(10) Patent No.: US 7,019,424 B2
(45) Date of Patent: Mar. 28, 2006

(54) CURRENT RECTIFIER ASSEMBLY FOR ROTATING ELECTRICAL MACHINES, IN PARTICULAR MOTOR VEHICLE ALTERNATOR

(75) Inventors: Michel Aeschlimann, Paris (FR); Sébastien Arrighi, Versailles (FR); Pierre Faverolle, Montgeron (FR); Thierry Hevia, Le Touquet (FR); Dirk Schulte, Bry sur Marne (FR); Serge Masriera, Lyons (FR)

(73) Assignee: Valeo Equipements Electriques Moteur, Creteil (FR)

( * ) Notice: Subject to any disclaimer, the term of this patent is extended or adjusted under 35 U.S.C. 154(b) by 97 days.

(21) Appl. No.: 10/363,545

(22) PCT Filed: Jul. 16, 2002

(86) PCT No.: PCT/FR02/02542

§ 371 (c)(1),
(2), (4) Date: May 27, 2003

(87) PCT Pub. No.: WO03/009452

PCT Pub. Date: Jan. 30, 2003

(65) Prior Publication Data

US 2003/0178899 A1 Sep. 25, 2003

(30) Foreign Application Priority Data

Jul. 16, 2001 (FR) .............................. 01 09477
Jul. 16, 2001 (FR) .............................. 01 09482

(51) Int. Cl.
*H02K 7/00* (2006.01)

(52) U.S. Cl. .......................... 310/68 D; 310/52; 310/64
(58) Field of Classification Search ............... 310/68 D, 310/52, 64; 31/64

See application file for complete search history.

(56) References Cited

U.S. PATENT DOCUMENTS

| 3,173,038 | A | * | 3/1965 | Brown ........................ 310/68 |
| 4,701,828 | A | | 10/1987 | Weiner |
| 5,729,063 | A | * | 3/1998 | Adachi ..................... 310/68 D |
| 5,949,166 | A | * | 9/1999 | Ooiwa ....................... 310/68 D |
| 5,991,184 | A | | 11/1999 | Russell et al. |
| 6,184,600 | B1 | * | 2/2001 | Asao et al. ................... 310/64 |
| 6,184,602 | B1 | * | 2/2001 | Ooiwa et al. ............. 310/68 D |
| 6,198,188 | B1 | * | 3/2001 | Ihata ........................ 310/68 D |
| 6,724,108 | B1 | * | 4/2004 | Nakano .................... 310/68 D |

FOREIGN PATENT DOCUMENTS

| EP | 0 905 863 A2 | 3/1999 |
| JP | A 58-148640 | 9/1983 |
| JP | A 59-198862 | 11/1984 |
| JP | A 61-106047 | 5/1986 |
| JP | A 6-20748 | 1/1994 |

* cited by examiner

*Primary Examiner*—Darren Schuberg
*Assistant Examiner*—Iraj A. Mohandesi
(74) *Attorney, Agent, or Firm*—Berenato, White & Stavish (57) ABSTRACT

Current rectifying equipment for rotary electrical machines has a rear bearing, of the type comprising a plurality of positive diodes (2) supported by a support (1) in the form of a plate, a plurality of negative diodes (7) supported by the rear bearing (6) of the machine, a device (9) for connecting the positive and negative diodes together, and structure for generating a forced axial stream of a coolant fluid, the support (1) for the diodes carrying cooling fins (4) which extend in the axial stream (F1) of the coolant fluid in the radial direction of the machine. The equipment includes means for effecting mixed cooling of the support for the negative diodes by convection and conduction. The invention can be used for alternators for motor vehicles.

14 Claims, 5 Drawing Sheets

CURRENT RECTIFIER ASSEMBLY FOR ROTATING ELECTRICAL MACHINES, IN PARTICULAR MOTOR VEHICLE ALTERNATOR

FIELD OF THE INVENTION

This invention relates to current rectifying equipment for rotary electrical machines, in particular alternators for motor vehicles, of the type comprising a stator and a rotor mounted inside the stator, the equipment comprising a plurality of positive diodes supported by a support in the form of a plate, a plurality of negative diodes supported by a support in the form of a plate, such as the rear support bearing for the rotor of the machine, a connecting device for electrically interconnecting the positive and negative diodes, and means for generating a forced flow of a coolant fluid flowing in the axial direction of the machine; the support for the positive diodes carrying, on its front face oriented towards the axis of the machine, cooling fins which extend in the axial flow of the coolant fluid in the radial direction of the machine. In a known way, the rotor, through its shaft, is mounted for rotation in front and rear bearings, each of which carries for this purpose a central ball bearing for rotary mounting of the shaft of the rotor. The bearings are so configured as to carry internally, at their outer periphery, the stator and more precisely the body of the stator. The bearings are connected together so as to constitute a casing, inside which, as mentioned above, the rotor and the stator are placed. The rear bearing carries the rectifying equipment which is overlaid by a cap which is fixed on the rear bearing. The supports are of metal, as are the bearings, which are earthed and which have through openings for passage of the coolant fluid, which is for example air; the flow of the coolant fluid is generated by at least one fan which is fixed to the rotor and which is located in the interior of the machine. The said bearings are connected together by means of screws or stretchers, for example, so as to constitute the casing.

STATE OF THE ART

Rectifying equipment of this type, which enables the alternating current induced by the stator to be converted into direct current for supplying the power consuming parts of the vehicle, is already known from French patent No. 2 687 861 of the Applicant. This rectifying equipment is designed to ensure the cooling of the support for the positive diodes by convection only, through flow of the fluid between the radial fins, while the cooling of the support for the negative diodes is obtained by conduction.

This rectifying equipment has the disadvantage that it does not allow cooling capacity to be increased to enable it to be used in alternators of higher power while at the same time giving an acceptable size.

OBJECT OF THE INVENTION

An object of the invention is to overcome the disadvantage just mentioned.

To this end, current rectifying equipment according to the invention is characterised in that it includes means for the mixed cooling of the support for the negative diodes by convection and conduction.

According to one feature of the invention, the negative diodes are fitted in local thickened portions on the upper face of the rear bearing of the machine.

According to a further feature of the invention, the cap includes, in the region of the rear bearing of the support, negative diodes, lateral inlet ports for a stream of coolant fluid, under the effect of the flow of the axial coolant fluid stream F1, which passes over the upper surface of the bearing including thickened portions for fitting of the negative diodes, to join the axial stream F1.

According to yet another feature of the invention, the thickened portions have a frustoconical form, in the upper face of which the negative diodes are fitted.

According to a still further feature of the invention, it includes means for cooling the support of the positive diodes by means of a radial stream F2 of coolant fluid.

According to yet a further feature of the invention, the support for the positive diodes includes, on its edge oriented towards the axis of the machine, means for diverting part of the axial coolant fluid stream F1 so as to create the radial stream F2 which passes over the upper surface of the support in which the positive diodes are fitted.

According to yet another feature of the invention, the radial coolant fluid stream F2 is caused to flow under the support of the positive diodes, towards the axis of the machine in order to rejoin the axial coolant fluid stream F1.

According to a still further feature of the invention, the means for diverting part of the axial coolant stream that constitutes the radial stream F2 of fluid for cooling the support for the positive diodes is constituted by a sill formed on the edge, oriented towards the axis of the machine, of the support for the positive diodes.

According to a still further feature of the invention, the support for the positive diodes is disposed between the connecting device and the rear bearing, in such a way that the ratio between its distance [sic].

According to yet another feature of the invention, the relationship between the thermal dissipation mass constituted by the thickened portions in which the negative diodes are fitted, and the energy losses occasioned by the said thickened portions, is arranged to be optimised by appropriate dimensioning of the form of the thickened portions.

BRIEF DESCRIPTION OF THE DRAWINGS

The invention will be understood more clearly, and further objects, features, details and advantages of it will appear more clearly, in the following explanatory description, which is made with reference to the attached diagrammatic drawings, given by way of example only and showing a number of embodiments of the invention, and in which.

DESCRIPTION OF EMBODIMENTS OF THE INVENTION

Figure 1:
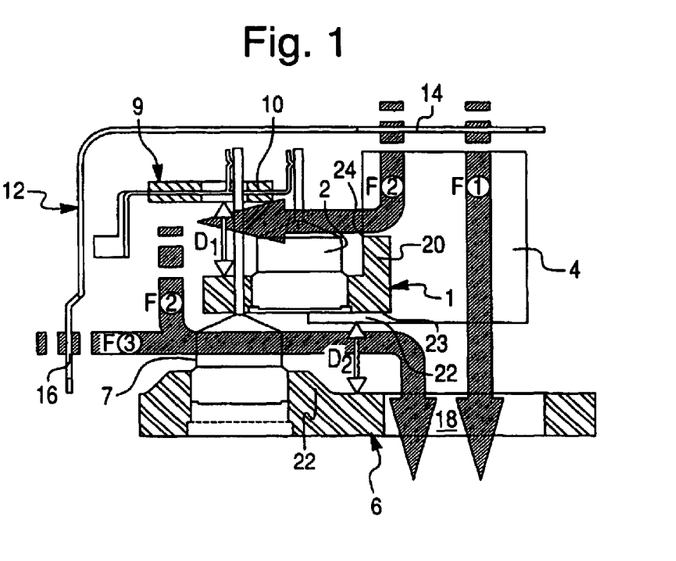
FIG. 1 is a view, in diagrammatic radial cross section, of a first embodiment of a current rectifying equipment according to the invention.

FIG. 1 is a diagrammatic view of a current rectifying equipment, for example for a polyphase alternator, the general structure of which is known per se, for example from French patent No. 2 687 861 and European patent 055 15 259.

Figure 3:
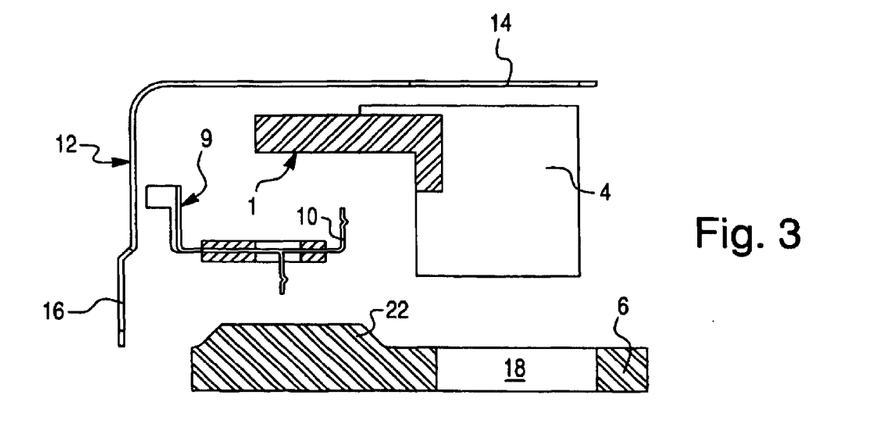
FIG. 3 is a diagrammatic view in radial cross section of another embodiment of the invention.
Figure 4:
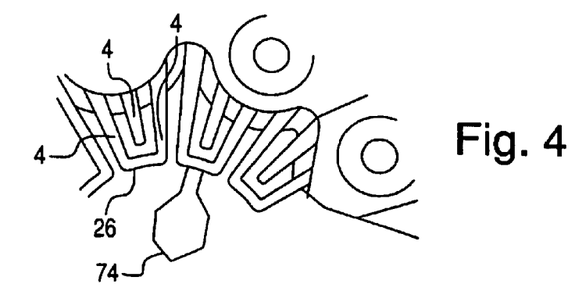
FIGS. 4A to 4D show three different versions of radial cooling fins for the rectifying equipment according to the invention.

In FIGS. 1 and 4, the rectifying equipment comprises a support 1, which is of metal in this case with a plurality of positive diodes 2, and which is in the form of a plate which carries on its front face, oriented towards the axis of rotation (not shown) of the machine, cooling fins 4 which extend towards the said axis. A function of the metallic support, which in this case is basically of aluminium, is to provide cooling for the diodes, and it is accordingly called the positive radiator. The radiator 1 is located at a predetermined axis distance D2 towards the axis of the machine, above the rear bearing 6, in the bore of which a plurality of negative diodes 7 are force-fitted. The rear bearing 6 is of metal and in the present example it is again essentially of aluminium. The reference numeral 9 designates the electrical connecting means which is disposed above the radiator 1, and the function of which is to interconnect, electrically, at 10, the tails 11 of each pair of positive and negative diodes 2 and 7. These diodes are connected in parallel. It should be noted that the supports are of metal, as are the bearings, which are earthed, while the connecting device 9 is of electrically insulating material in which are encapsulated electrical connecting strips which are exposed in certain places in the known way, in particular to provide local contact at 10 with the tails of the diodes and electrical connection with the outputs of the phases of the stator of the alternator. The locations of these exposed parts can be seen in FIGS. 1, 3 and 5. In these Figures, the exposed contact portions 10 with the tails 11 are oriented axially with respect to the axis of rotation of the machine, and are press-formed with local deformations to make local contact with the tails 11. These contact portions are parallel to each other. The tails of the negative diodes are longer than those of the positive diodes. The tails 11 are directed axially away from the rear bearing. Also visible, diagrammatically, in the same Figures, are exposed portions in the form of lugs for fastening by seaming to the appropriate outputs of the phases of the alternator.

The rectifying device which has just been described is enclosed by a hollow cap 12, which has inlet ports 14 for a coolant fluid, for example air, in its horizontal upper wall at right angles to the axis of the machine, that is to say oriented transversely, while in its axially oriented annular lateral wall it has lateral inlet ports 16 for coolant fluid. These ports are located, with respect to the axis of the machine, at the level of the space between the radiator and the rear bearing 6. The cap is fixed with respect to the metal rear bearing 6, and in this example it is of electrically insulating material, which is preferably a mouldable plastics material. It will be noted that the axially oriented annular wall of the cap has the ports 16 located only close to the rear bearing, so as to direct the coolant fluid in a manner to be described later herein. The upper wall of the cap constitutes the base of the latter.

The rectifying equipment just described is cooled by forced flow of a coolant fluid which is preferably air and which is driven by a blower known per se (shown in FIG. 8), which is coupled to the rotor of the machine for rotation with it. The rear bearing has passage openings for the coolant fluid which carry the reference 18 and which are aligned substantially with the ports 14 in the upper wall of the cap 12, the latter being secured on the bearing 6, for example by snap-fitting.

In accordance with a preferred feature of the invention, the radiator 1 includes, at the level of its radially inner edge and oriented towards the axis of the machine, a sill 20 which extends axially upwards, though its provision is not obligatory. In all cases, the radiator 1 has a flat zone for mounting the positive diodes. This zone extends to the outer periphery of the radiator and is oriented transversely with respect to the axis of the machine.

Figure 2A:
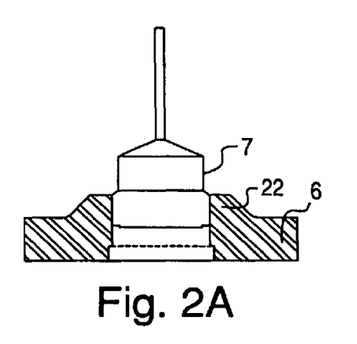
FIGS. 2A and 2B are detail views showing the fitting of a negative diode in its support in accordance with the invention.
Figure 2B:
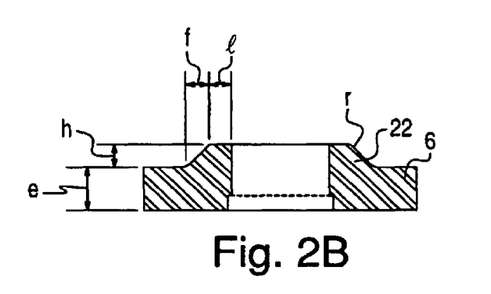

In accordance with another feature of the invention, the rear bearing 6 includes, in the location at which each negative diode 7 is fitted, a frustoconical thickened portion 22 which is seen in greater detail in FIGS. 2A and 2B. These frustoconical thickened portions 22 on the top face of the rear bearing, in which the negative diodes are fitted directly, provide better cooling of the diodes. In this connection, mixed cooling by conduction and convection is obtained as will be described later herein. It should also be noted that the radial cooling fins 7 are extended at 22 below the face 23 of the radiator 1, almost into the zone in which the positive diodes 2 are fitted. In addition, the fins 4 extend as far as the radially outer edge 24 of the sill 20. Due in particular to the sill 20, the rectifying equipment in accordance with the invention enables an advantageous cooling flow configuration to be obtained which comprises a first axial stream F1 that passes axially directly through the ports 14 in the upper wall of the cap 2 and the apertures 18 in the rear bearing, flowing between the cooling fins 4.

The second air stream F2 is produced by the sill 20, which diverts radially outwards some of the air which is aspirated through each upper cap 14. This stream F2 passes over the upper face of the radiator 1 and thus over the positive diodes 2, so that it then flows axially in the annular space between the cap 12 and radiator 1, and then in the space between the radiator 1 and the rear bearing 6, radially towards the axis of the machine, before it passes through the apertures 18 in the rear bearing under the influence of a third air stream F3 which enters through the lateral ports 16 in the cap 12 and flows radially, to join the stream F2 in the space between the lower face 23 of the radiator 1 and the upper face of the bearing 6.

It should be noted that the connector 9 is positioned above the radiator 1, so as to obtain good radial channelling of the stream F2. The positioning of the radiator 1 with respect to the connector 9 on the one hand and the bearing 6 on the other hand, is also important. It has been found that optimum positioning is obtained when the following relationship is observed:

$$0.85 < D2/D1 < 1.25$$

where D1 is the distance between the connector 9 and the top face of the radiator 1, and D2 is the distance between the top face of the rear bearing 6 and the bottom edge of the extensions 22 of the cooling fins 4 below the radiator 1.

Concerning the sill 20, careful choice of its form optimises its effect, that is to say the diversion of some of the air that enters axially through the upper ports 14 and then passes radially so as to cool the radiator or positive dissipator. This stream F2, towards the outside of the machine above the positive radiator, is then driven inwards, under the radiator, by the stream F3, which enters through the lateral ports 16 in the cap facing the space which is situated between the rear bearing and the radiator. The fin portions 22 situated below the radiator also ensure improved cooling.

It should be noted that the space between the components has been optimised for the stream F3 in such a way that the energy losses in the machine are reduced to a minimum. In this connection, the less loss of energy there is, the higher will be the velocity of the cooling stream; this is important for the cooling of the components. It is thus of advantage to ensure that D2 is greater than D1.

It should also be noted that cooling of the negative diodes can be optimised by appropriate dimensioning of the form of the frustoconical thickened portions 22. In this connection, these thickened portions enable the heat exchange surface to be increased between the rear bearing and the air, and they perform the function of fins for cooling by convection while constituting obstacles for the flow of the air stream which give rise to energy loss.

By way of example, for alternators of 2.5 to 3 kW, optimisation is obtained between the heat dissipation mass and the energy lost in flow of the coolant for a thickness of the rear bearing e=5 mm+2 and −1 mm, by choosing the greater width 1 in FIG. 2B to have a minimum value of 1.5 mm, so as to have enough material to dissipate the heat by conduction, and a maximum value of 3 mm in order to minimise the energy losses. The height h for the same reasons must be in the range between 2 mm and 4 mm, which enables axial size to be optimised also. It is possible to formulate an optimum relationship for the slope of the cone such that:

$$1 < h/l < 5,$$

where h is the height of the upper face of the frustoconical thickened portion as compared with the upper face of the bearing, and constitutes the horizontal distance between the start and the finish of the slope p.

In accordance with yet another essential feature of the invention, the form and surface area for heat exchange of the radial fins 4 have been optimised in order to obtain optimum cooling effect within a minimum size. FIGS. 4A to 4D show three possible configurations of these fins. It should be noted that the outer perimeter of the positive radiator and also of any sill may be made wavy, so that the radial extension of the fins is different.

Figure 4A:
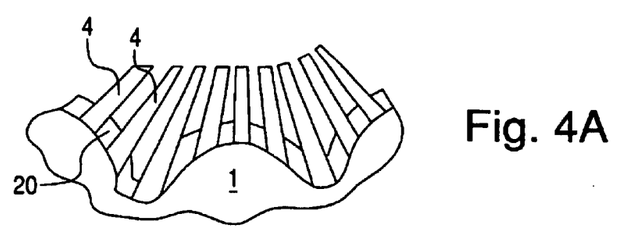

The version of the fins shown in FIG. 4A has the particular feature that the fins are thin. The distinguishing feature in the embodiment in FIGS. 4B and 4D lies in the fact that the fins are grouped in threes, the outer fins being joined together through a closing strap 26. FIG. 4C also has fins grouped together, but in the form of groups having four fins, with a continuous connecting strap 28 on the ends of the outer fins of each group. The advantages of FIGS. 4A to 4D will be described below.

It can be seen that the fins are disposed facing axial apertures in the cap and bearing, so as to optimise cooling through a maximised heat exchange surface and a reduction in energy losses.

FIG. 3 shows a further embodiment of the rectifying means of the invention. The same reference signs are used in FIG. 3 for components and elements which are identical or similar to the embodiment in FIG. 1. The particularity of the embodiment shown in FIG. 3 lies in the fact that the connector 9 is disposed between the positive radiator 1 and the rear bearing 6, which enables positive and negative diodes (not shown) to be mounted head-to-tail.

Figure 5:
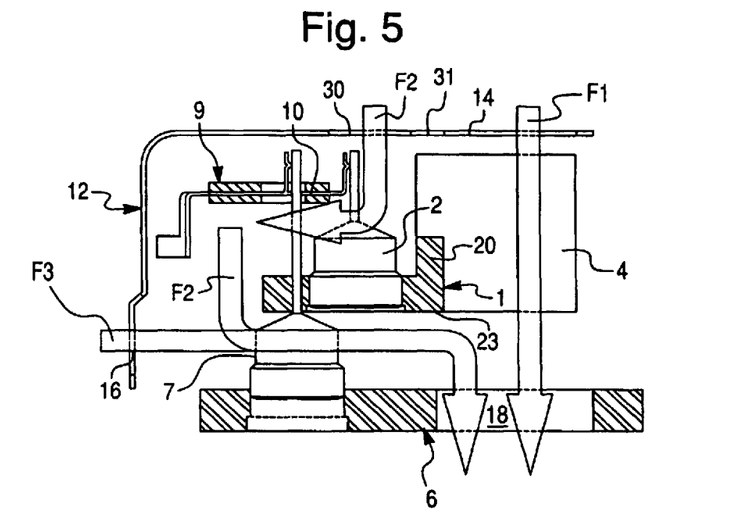
FIG. 5 is a view in diagrammatic radial cross section, for yet another embodiment of a current rectifying equipment according to the invention.
Figure 6:
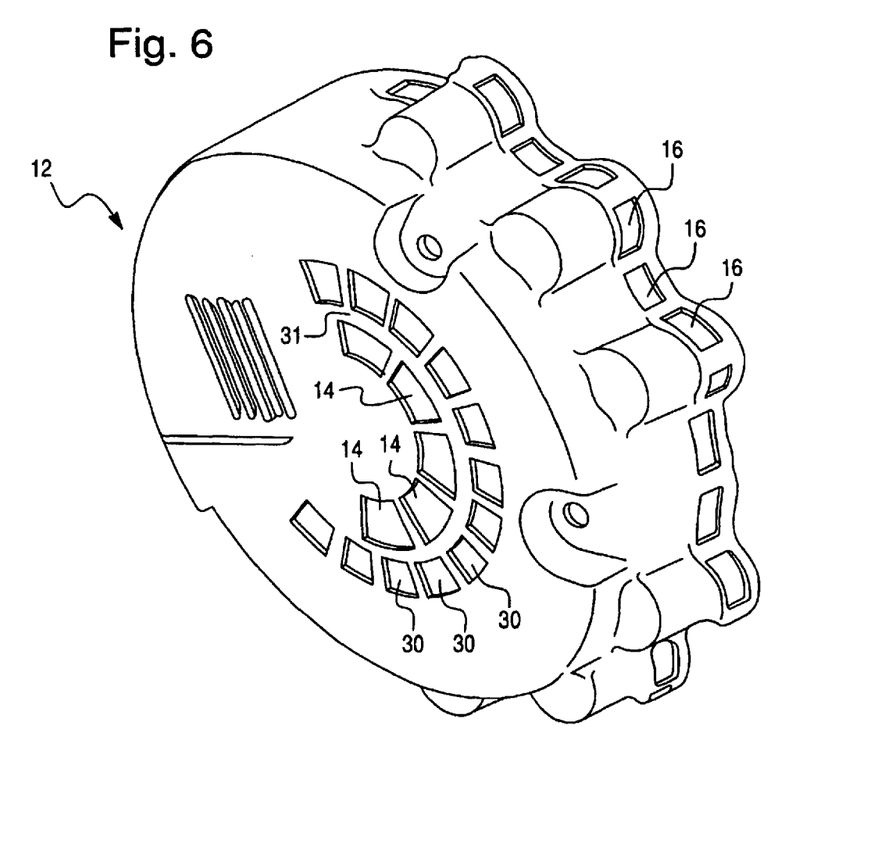
FIG. 6 is a perspective view of the cap shown at 12 in FIG. 5.

FIGS. 5 and 6 show a further embodiment of the rectifying means according to the invention. The particular advantageous feature of this embodiment is that the air stream F2, cooling the radiator 1 by convection by flowing along the upper and lower surfaces of the latter, enters through specific apertures 30 formed in the top base wall of the cap 12 above the positive diodes 2. The apertures 30 are separated from the ports 14 by a solid annular zone 31 which, in the axial direction of the machine, is situated generally above the sill 20. As FIG. 6 shows, the apertures 30 are disposed, like the ports 14, in a zone formed as the arc of a circle which is coaxial with the zone of the ports 14 and radially outside the latter.

It will also be seen that, in the embodiment in FIG. 5, the upper surface of the rear bearing 6 does not include frustoconical, thickened mounting portions for the negative diodes 7. These diodes are fitted in an upper surface of the bearing, which is flat. Finally, the radial fins 4 terminate on the side of the lower surface 23 of the positive radiator 1 at the level of this surface. In consequence, there is no fin portion below the radiator as is the case in FIG. 1. It should however be noted that the considerations relating to the distances D1 and D2, as described earlier herein, also apply to the embodiment of FIG. 5.

The rectifying equipment of the invention has the further advantage that it is easy to assemble. In this connection, assembly is carried out by stacking the various components through the top of the machine, that is to say from the outside. This enables the rear bearing to be assembled before it is fitted on the rest of the machine. Similarly, the diodes are inserted in the same direction with the diode tails all pointing upwards, which makes it possible to use only a single soldering means and eliminates transfer of parts. In addition, the diodes are positioned in such a way that there is only a single soldering plane. The positioning of the parts has been designed in such a way as to have the heaviest parts as close as possible to the fastenings, thereby limiting their cantilever. This leads to improved reliability, and enables vibrations and resonant frequencies to be higher, so as to avoid points of magnetic noise due to the magnetic forces generated by the machine.

Finally, the rectifier bridge may be connected in a three-phase or a six-phase mode. Because of its small size, the rectifying equipment may also be used as a three-phase bridge with six diodes, or eight diodes (three-phase with a rectified neutral point) or twelve diodes (six-phase or three-phase in the case of extreme heat).

The invention can of course be modified in many ways, as described and shown in the drawings. For example, the sill could have any other appropriate form, and the disposition of the apertures could be chosen differently, so long as the creation of the cooling air streams F1 to F3 is ensured.

This equipment is preferably for an alternator of the same type as that described in the documents FR-01 04770 filed on 5th Apr. 2001 and published under the No. FR-A-2 820 896, and FR-A-2 819 117. For more details, reference should be made to those documents, which disclose a fan carried by the rotor of the alternator and fitted adjacently to the rear bearing. In that document, the stator includes a body which is interposed between the front and rear bearings and which defines the casing. This body consists of a stack of laminations having slots in their inner periphery, in which are mounted electrically conductive elements in the form of bars arranged to form grids, the outputs of which are connected to the connectors 9. These bars are preferably in the form of hairpins comprising a generally U-shaped head which joins two branches together, the free ends of the branches constituting junction zones with the other hairpins and branches. The heads are fitted in the vicinity of the rear bearing.

Preferably, the claw-type rotor of the machine includes seven pole pairs; the outer diameter of the cylindrical body of the stator is between 132 mm and 138 mm.

Figure 7:
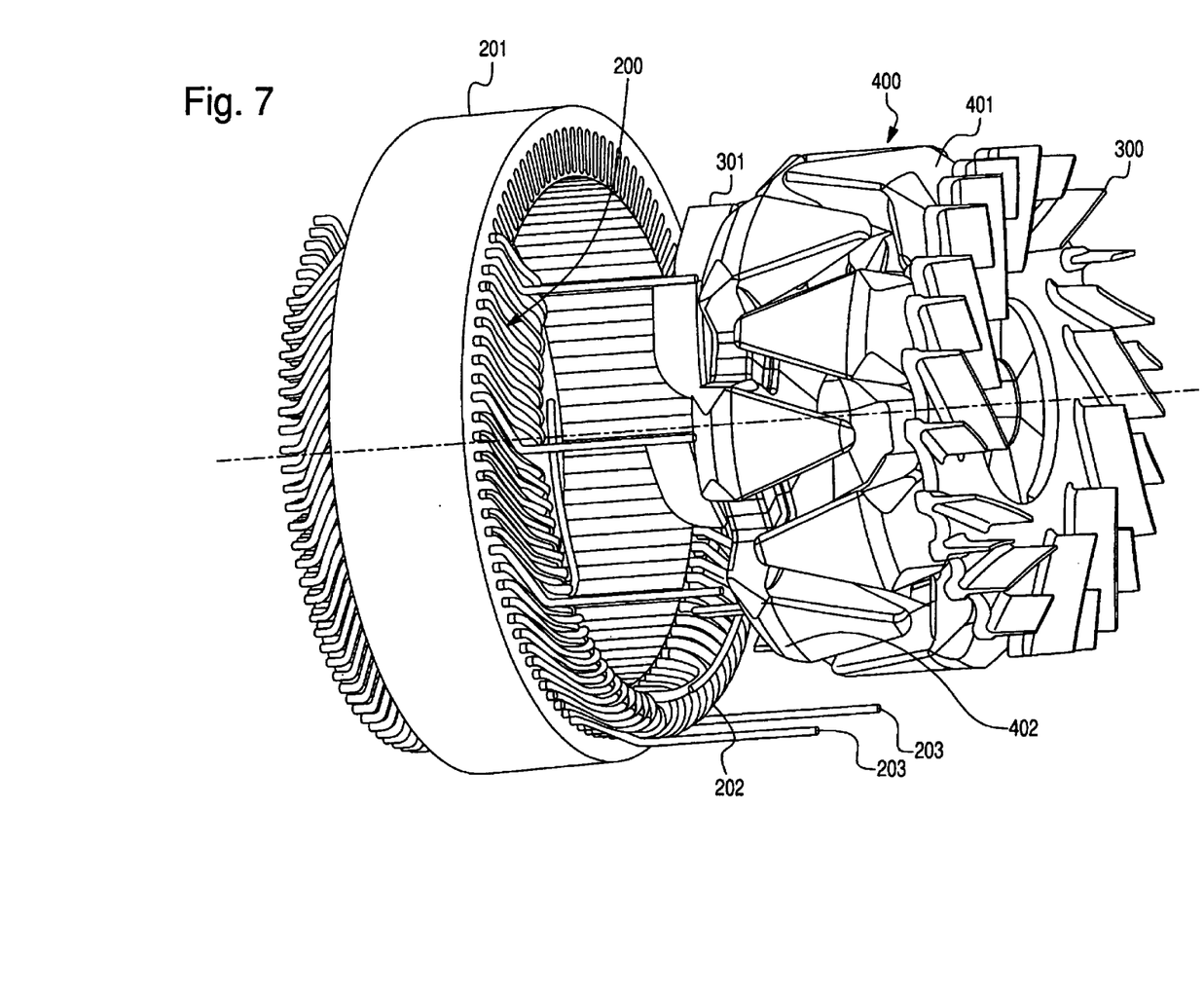
FIG. 7 is a perspective view of the rectifying equipment according to the invention, when equipped with its cap and mounted on the rear bearing of the alternator.
Figure 8:
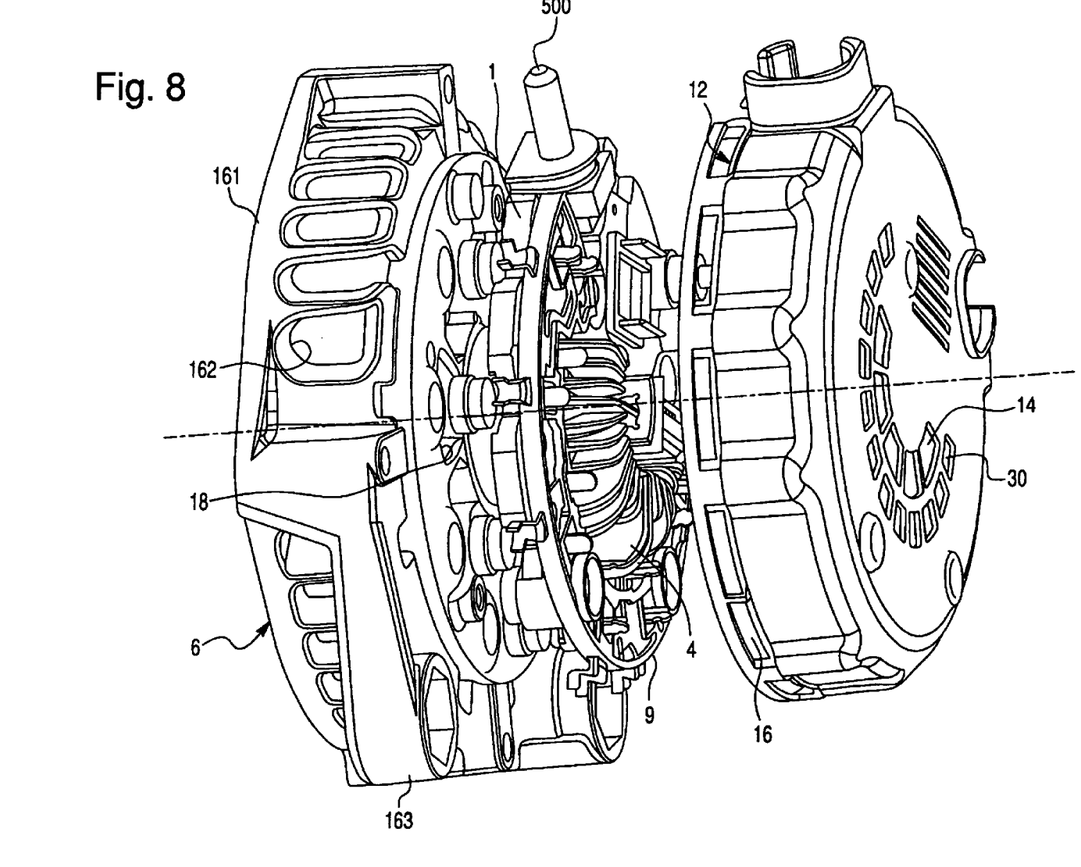
FIG. 8 is a perspective view of one embodiment of an alternator stator and rotor associated with the rectifying equipment according to the invention.

Thus in FIG. 7, a stator can be seen at 200, the body 201 of which carries hairpins 202 which are not all shown, in order to show the slots defined by the body for passage of the branches of the hairpins 202. The heads of the hairpins constitute a chignon on the outside of the body 201 and are adjacent to the rear bearing 6, which is best seen in FIG. 8. The outputs of the phases, to be fixed on the connector 9, are seen at 203.

The heads of the hairpins 202 are placed on the outside of a rear fan 300, which is of the centrifugal type in this case and which is carried by the rear axial end of a claw-type rotor 400, which carries at its other axial end a front fan 301 adjacent to the front bearing (not shown) of the alternator.

The hairpins 202 have front portions which are welded to the outside of the body of the stator and are separated so as to form the windings of the phases of the stator, as described in the above mentioned documents.

Four hairpin branches are mounted in each slot.

The rotor 400 comprises two claw-type pole wheels 401, 402, between the plates of which the excitation winding carried by the rotor is mounted.

This rotor has seven pole pairs, as mentioned above; the claws constitute magnetic poles when the excitation winding is energised.

FIG. 8 shows in perspective the rectifying device of the type in FIGS. 1 and 4 associated with the rotor and with the stator of FIG. 7.

Some parts are shown cut away in this Figure, in particular to show the electrical contact tracks of the connector 9.

This Figure shows at 500 a terminal B1 which is arranged to be connected to the terminal of the battery of the vehicle, together with the radially oriented fins 4. These fins extend radially and channel the coolant fluid stream so as to cause it to flow axially.

The rear bearing 6 is hollow, with its base in the form of a plate carrying the negative diodes of FIG. 1, while its axially oriented annular flange 161 carries ports 162 for evacuating the air aspirated by the rear fan 300 through the air admission ports 18 in the base of the rear bearing 6. The flange 161 surrounds the fan 300 and the heads of the hairpins 202.

Also shown, at 163, is an arm or lug for fastening the alternator to a fixed part of the vehicle.

Preferably, an insulator is interposed between the electrically conductive elements and the edges of the slots. In one embodiment this insulator is mounted in the slots before the electrically conductive elements. Because of the conductive elements, in the form of bars which are preferably of rectangular cross section, the power of the alternator is increased. The rectifying device according to the invention is very suitable for this type of alternator. Because of the equipment according to the invention, the power of the rotor can be increased, the latter having, in one embodiment, a profiled excitation winding as described in the document FR-00 06853 filed on 29 May 2001, given that the stator surrounds the rotor, which is typically of the claw type. This rotor has rings connected to the ends of the rotor winding and serving as friction tracks for the brushes of brush carriers connected to the voltage regulator.

Given that the positive radiator is formed by moulding, a large number of fine cooling fins 4 (FIG. 4A) are provided, extending radially towards the axis 1 of the alternator. The fins lie in a plane which is oriented both radially and parallel to the axis of the machine. The fins, which have a large extension in both the axial and radial directions, give the radiator a very large heat exchange surface, and thereby compensate for the lack of space at the rear end of the alternators. The large number of thin cooling fins enables the radiator according to the invention to be employed in rectifying equipment, that is to say rectifier bridges, of high current capacity necessitating the fitting of twelve diodes, namely six diodes on the positive radiator and six diodes in the negative radiator.

However, due to the fact that the fins 4 extend radially, the ends of adjacent fins 4 are very close to each other. The proximity of the fins at their ends has the disadvantage that the moulding tool is fragile between the fins, and the stripping tool used to prevent moulding flash between the said fins is fragile. At the same time, the summit radii of the fins are very small. This is further aggravated by the stripping necessary on removal of the components from the mould. There is therefore a risk of poor filling of the mould, with deposition of aluminium in the mould at this point. To these problems may be added the fragility of the fins during handling.

Figure 4B:
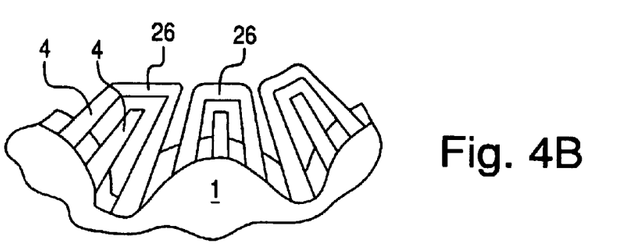
Figure 4C:
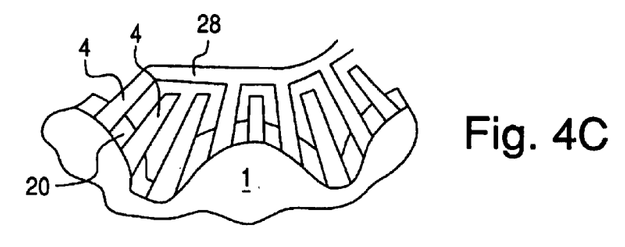

FIGS. 4B and 4C show two solutions to the problems just described. In the embodiment of an improved positive radiator according to FIG. 4A, the fins are grouped in threes and the ends of the two outermost fins of each group so constituted are joined together by a connecting strap 26, while the central fin remains free. In the version shown in FIG. 4C, the various connecting straps are joined together to constitute a continuous connected strip which extends between the two outermost fins.

FIG. 4D illustrates the advantageous possibility that wiping blades 74 can be formed in association with the connecting straps, which enables filling conditions for the mould to be optimised. These blades 74 are removed after the moulding operation, and enable fine straps to be obtained.

The positive radiators described above have numerous advantages. All of the various embodiments shown have the major advantage that they have a large heat exchange surface formed by the large number of thin cooling fins. Given that the radiator is made in the form of a single plate, the fins may be fitted at regular intervals over practically the whole radially inner edge of the radiator.

The improved positive radiators in FIGS. 4A to 4D have additional advantages, such as the stiffening of the mould tool between the fins, an increase in the summit radius of the fins not joined together, which minimises the danger of poor filling of the mould and of aluminium deposition in the mould at that point, and elimination of the low fin end radius for those fins that are connected together, which contributes to the elimination of the danger of poor mould filling or aluminium deposition in the mould at that point. In consequence, this leads to improved mould filling conditions. The channelling of the air stream into the zones of fins joined together gives an increase in the efficiency of the radiator by Venturi effect. The stiffening of the radiator resulting from the connecting straps or connecting bar leads to a reduction in the risk of damage of the radiators during handling and a reduction in the noise resulting from putting the fins into resonance. It should also be noted that this leads to an increase in the volume of aluminium in a given size, and in consequence, improved efficiency of the radiator in the transitional phases.

What is claimed is:

1. Current rectifying equipment for rotary electrical machines having an axis and a rear bearing, of the type having a plurality of positive diodes supported by a first support in the form of a plate, a plurality of negative diodes supported by a second support in the form of a plate, carried by the rear bearing, a connecting device (9) for electrically interconnecting the positive and negative diodes, a cap which overlays said current rectifying equipment and means for generating a forced axial flow (F1) of a coolant fluid flowing in the axial direction of the axis of the machine, the first support for the positive diodes carrying on its front face, which is oriented towards the axis of the machine, cooling fins which extend in said axial flow of the coolant fluid in the radial direction of the machine, wherein said current rectifying equipment includes means for the mixed cooling of the second support for the negative diodes by convection and conduction.

2. Equipment according to claim 1, wherein the negative diodes (7) are fitted in the rear bearing and wherein the cap (12) includes, in the region of the rear bearing (6) of the second support, negative diodes (7), lateral inlet ports (16) for a stream (F3) of coolant fluid, under the effect of the flow of the axial coolant fluid stream (F1), which passes over the upper surface of the rear bearing in which the negative diodes (7) are fitted.

3. Equipment according to claim 2, wherein the negative diodes are fitted in local thickened portions (22) on the upper face of the rear bearing (6) of the machine.

4. Equipment according to claim 3, wherein the thickened portions have a frustoconical form, in the upper face of the rear bearing in which the negative diodes (7) are fitted.

5. Equipment according to claim 1, further including means for cooling the support (1) of the positive diodes (2) by means of a radial stream (F2) of coolant fluid.

6. Equipment according to claim 5, wherein the means for cooling by a radial stream (F2) of coolant fluid comprise apertures (14, 30) which are arranged in the wall of the casing that covers the equipment, extending at right angles to the axis of the machine.

7. Equipment according to claim 6, wherein the support (1) for the positive diodes (2) includes, on its edge oriented towards the axis of the machine, means for diverting part of the axial coolant fluid stream (F1) so as to create the radial stream (F2) which passes over the upper surface of the support (1) in which the positive diodes (2) are fitted.

8. Equipment according to claim 7, wherein the radial coolant fluid stream (F2) is caused to flow under the support (1) of the positive diodes, towards the axis of the machine in order to rejoin the axial coolant fluid stream (F1).

9. Equipment according to claim 8, wherein the radial flow of the radial coolant fluid stream (F2) towards the axis of the machine, under the support (1) for the positive diodes (2), is driven by the radial cooling stream (F3).

10. Equipment according to claim 6, wherein the means for cooling by means of the radial fluid stream (F2) comprises, on the edge of the support (1) for the positive diodes (2) which is oriented towards the axis of the machine, an element such as a sill (20), which projects from the support towards the inlet ports (14, 30) between the coolant fluid streams (F1) and (F2).

11. Current rectifying equipment for rotary electrical machines having an axis and a rear bearing, of the type having a plurality of positive diodes supported by a first support in the form of a plate, a plurality of negative diodes supported by a second support in the form of a plate, carried by the rear bearing, a connecting device (9) for electrically interconnecting the positive and negative diodes, a cap which overlays said current rectifying equipment and means for generating a forced flow (F1) of a coolant fluid flowing in the axial direction of the axis of the machine, the first support for the positive diodes carrying on its front face, which is oriented towards the axis of the machine, cooling fins which extend in the said axial flow of the coolant fluid in the radial direction of the machine, wherein said current rectifying equipment includes means for the mixed cooling of the second support for the negative diodes by convection and conduction, and wherein the first support (1) for the positive diodes (2) is disposed between the connecting device (9) and the rear bearing (6), in such a way that the ratio between its distance (D2) from the rear bearing (6) and its distance (D1) from the connecting device is in the range between 0.85 and 1.25.

12. Equipment according to claim 11, wherein said ratio of distances is preferably greater than 1.

13. Current rectifying equipment for rotary electrical machines having an axis and a rear bearing, of the type having a plurality of positive diodes supported by a first support in the form of a plate, a plurality of negative diodes supported by a second support in the form of a plate, carried by the rear bearing, a connecting device (9) for electrically interconnecting the positive and negative diodes, a cap which overlays said current rectifying equipment and means for generating a forced flow (F1) of a coolant fluid flowing in the axial direction of the axis of the machine, the first support for the positive diodes carrying on its front face, which is oriented towards the axis of the machine, cooling fins which extend in the said axial flow of the coolant fluid in the radial direction of the machine, wherein said current rectifying equipment includes means for the mixed cooling of the second support for the negative diodes by convection and conduction, further including means for cooling the support (1) of the positive diodes (2) by means of a radial stream (F2) of coolant fluid, wherein the means for cooling by a radial stream (F2) of coolant fluid comprise apertures (14, 30) which are arranged in the wall of the casing that covers the equipment, extending at right angles to the axis of the machine, wherein the means for cooling by means of the radial fluid stream (F2) comprises, on the edge of the support (1) for the positive diodes (2) which is oriented towards the axis of the machine, an element such as a sill (20), which projects from the support towards the inlet ports (14, 30) between the coolant fluid streams (F1) and (F2), and wherein the apertures formed in the overlying wall of the cap (12) comprise, juxtaposed in the radial direction of the machine, input ports (14) for the coolant fluid stream (F1) and inlet ports (30) for the coolant fluid (F2).

14. Equipment according to claim 13, wherein said inlet ports (14, 30) for the coolant fluid streams (F1) and (F2) are separated by a flat annular zone (31) of the casing, situated at a level above the sill (20).

* * * * *